Breech-Loaders.
1515 A
DIVISION.
Wm Thornton's Rifle. (See Thornton & Hall)
Patented May 21. 1811.
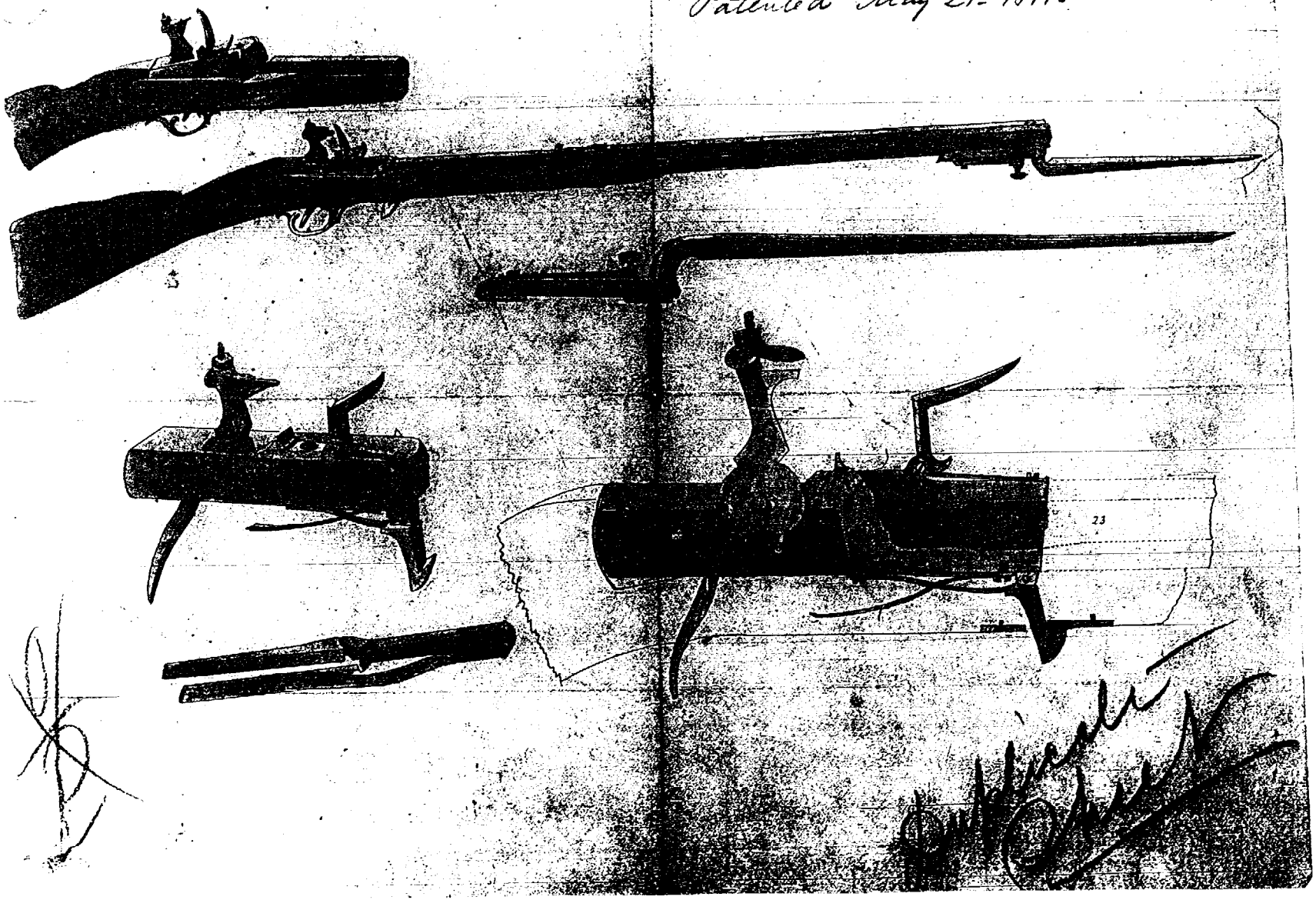

Wm. Thornton's Paper on
improved Gun
Patented May 2d 1811.

1515X

This invention consists of a Receiver, moveable by sliding either perpendicularly or laterally or endwise, or else moveable on an axis either perpendicularly or laterally, & connected with the Barrel by a piece or pieces of metal. — The receiver is moved either by means of a spring, lever or screw, & is kept in its place when shut down, or brought in a line with the barrel, by means of a catch, lever screw or bolt. — It is applicable to every species of fire arms. — Its advantages are dispatch & convenience in loading, in every situation, either lying on the ground, sitting, standing or on horseback.

More particular description

The receiver consists of a cavity or chamber in solid metal, or a Chamber of one metal may be let or screwed into another metal. — This Cavity or Chamber for containing the charge may either be conical, cylindrical or otherwise. The muzzle of the receiver should either be arched perpendicularly from top to bottom, making a Curve, whose center is the axis on which the receiver moves, or be cut slantingly so that its upper end may be a tangent to the lower part of the Curve. —

The Lock may either be let into the solid metal of the Chamber or attached to it, or placed on the side of the piece as usual, taking care to form the parts correspondently. The Chamber receiver, or cavity whether containing the Lock or not is connected with the barrel by two pieces of metal & moves perpendicularly or vertically on an axis, & its sent
from the barrel is prevented by two shoulders near its
muzzle, which enter two notches in the side pieces of
metal. The rear parts of these shoulders as also the
rear parts of these notches are formed to a curve describ
ed from the axis on which the receiver turns.— The
rear extremity of the receiver is formed in the same way
that it may make a good joint with the wood work of
the stock.

A screw may pass thro the rear extremities of
the side pieces of metal serving to connect them with the
Stock. Under the barrel are loops as for common guns,
by which it is fastened to the stock. Under the fore
part of the barrel is a dove tail'd rib in military
guns with a hole near each extremity for receiving
a pin attached to a spring on a bayonet, by which
the bayonet is kept to its place either when fixed to
the end of the Barrel or when retracted.— The bayon
et has instead of a socket a handle in which is a
dove taild groove corresponding to the rib of the barrel.

In case of the gun being whole stock'd
the rib must be shorter, & no provision made for re
tracting the Bayonet.

Fig. 1. — The chamber of solid metal
or one metal screwed or let into another— This chamber
or receiver may be conical, cylindrical or otherwise & the
muzzle of the receiver may be arched perpendicularly
from top to bottom, making a curve whose center is at
twelve, or be cut slantingly, so that its end may be a
tangent to the lower part of the curve at 22.

Fig. 2.— The cock which may be made
in any elegant form.—

3.— The Hammer; the spring of which may be concealed.

1515x

4. — The touch hole when made at the top it enters at the centre of the chamber. The touch-hole may be made at the side & the lock be put on the outside of highly finished pieces. —

5. — The trigger & Dog both in one.

6. — The main spring which may be made in various ways.

7. — The main spring which answers also for the hammer-spring fastened to the receiver.

8. — The trigger-spring.

9. — Preventors, which are solid shoulders, or may be screwed on to the chamber-piece & which by entering into the notches of the side-pieces or supporters 16. 16. prevent the recoil from the Barrel while discharging; for if the chamber be made very tight it will be difficult to shut it after a few discharges, in consequence of its expansion. — This precaution was therefore found necessary and answers completely. —

10. Elevator or spring, which throws up the Chamber or receiver.

11. — Ketch spring which passes thro the stock.

12. — The axis or centre on which the receiver or chamber moves up & down. —

13. — Bottom of the chamber. —

14. — Right supporter. —

15. — Left supporter, by which the receiver is connected with the Barrel when elevated.

16. — The supporters.

17. — Screw for Hammer

18. — Guard which is fastened to the Barrel

19. – One of the sights.

20. – Screw by which the supporters are fastened to the Barrel. –

21. – Gun Stock. –

22. – Joint between the chamber & stock.

23. – Entrance of the chamber which may be bell-formed at its hinder part to receive with ease the Ball or shot when propelled from the chamber. The barrel may be rifled or smooth-bored. –

24. – The powder chamber. –

25. – Place for the Ball or Shot, charged either by Cartridge or Flask.

26. – One species of catch, over which may be a guard any other catch either on the side, or a bolt on the side or a bolt formed by the Trigger-guard may be substituted. –

27. – Screw for Elevator. –

28. – Screw pin, by which the left supporter is connected with the Stock. –

29. – Screws by which the ground is fastened to the stock. –

1515x